US005178360A

United States Patent [19]

Young

[11] Patent Number: 5,178,360

[45] Date of Patent: Jan. 12, 1993

[54] WIRE CUTTING VALVE ACTUATOR

[75] Inventor: Terry G. Young, Spring, Tex.

[73] Assignee: Baker Hughes Incorporated, Houston, Tex.

[21] Appl. No.: 585,721

[22] Filed: Sep. 19, 1990

[51] Int. Cl.[5] ..................... F16K 31/122; F15B 15/14; F15B 20/00

[52] U.S. Cl. .................................. 251/62; 92/130 A; 92/130 C; 92/130 D; 251/63.6

[58] Field of Search ............ 92/130 A, 130 B, 130 C, 92/130 D; 251/62, 63.6

[56] References Cited

U.S. PATENT DOCUMENTS

| | | | |
|---|---|---|---|
| 3,272,087 | 9/1966 | Culver . | |
| 3,320,861 | 5/1967 | Johnson . | |
| 4,372,333 | 2/1983 | Goans . | |
| 4,519,575 | 5/1985 | Akkerman . | |
| 4,523,639 | 6/1985 | Howard, Jr. . | |
| 4,651,970 | 3/1987 | Sadler | 92/130 A X |
| 4,871,143 | 10/1989 | Baker | 92/130 B X |
| 4,925,154 | 5/1990 | Baker | 92/130 B X |

OTHER PUBLICATIONS

Otis Engineering Corporation brochure #OEC5315(03094) dated Apr. 1982 "Introducing the Otis Type WC Actuator".

AVA International Catalog No. PA8603 entitled "Gate Valve (SSV) Actuators".

*Primary Examiner*—Gerald A. Michalsky

*Attorney, Agent, or Firm*—Rosenblatt & Associates

[57] ABSTRACT

The invention is a valve actuator or a booster module for an existing valve actuator that provides an incremental force to the valve stem at a position close to valve closure. The force is stored in a spring which is held in the compressed position by a collet. Upon sufficient movement of the valve actuator stem in the direction towards valve closure, the collet which had previously held the spring in a compressed position is freed to move to allow the spring to expand against the collet. Since movement of the collet has caused it to be engaged to the valve actuator stem, the spring forces are transmitted directly to the valve actuator stem via the collet. The spring is oriented in a direction substantially parallel to the valve stem so that substantially all of its retained energy is transmitted directly to the valve stem through the collet.

10 Claims, 2 Drawing Sheets

WIRE CUTTING VALVE ACTUATOR

FIELD OF THE INVENTION

The field of this invention relates to the field of valve actuators, specifically those designed to cut a wireline during valve closure. The invention also relates to booster modules adaptable for mounting on existing valve actuators to provide an incremental force required to cut a wireline shortly before full closure of the valve.

BACKGROUND OF THE INVENTION

Traditionally, valve actuators have been provided with one or more springs which bias a piston connected to a valve shaft to close the valve in the event of an emergency situation or in the case of hydraulic failure. Typically in these actuators, hydraulic forces are applied to an opposing side of a piston to move the valve into an open position and at the same time compress the return spring or springs. Typical of such actuators is an actuator made by Otis Engineering Corporation, Model WC. The problem with existing actuators is that if there is a wireline going through the open valve, a force of at least 7-8,000 lbs. is necessary to be applied to the valve actuator shaft to ensure that wirelines up to 7/32nds of an inch can be efficiently cut to seal off the well. This additional force is necessary close to the completion of the stroke of the valve actuator shaft since as the valve actuator shaft moves, the wireline is displaced until the valve is almost closed. At that point, the valve gate bears against the wireline in order to cut it off. The problem with prior designs has been that the internal spring is almost fully extended back to its extended position at the time when the maximum force for cutting the wireline is required. To compensate for this, prior designs like the Otis Model WC actuator have put in oversized springs such that at the time the necessary 7-8,000 lbs. is required for wire cutting, the spring still retains that much force at its then-current position within the actuator. This type of design forces the springs to be oversized such that when they are fully compressed (when the valve is open), they store approximately 20,000 lbs. of force. When these springs get to the critical point where the cutting force is necessary, they still retain approximately 8,000 lbs. of stored energy. This generally occurs when the spring reaches approximately 1-¼ inches short of its fully extended position. Similar designs to the Otis WC actuator have been put out by Vetco-Gray, which has a Graysafe reduced height hydraulic actuator (RHA), which uses a volute spring instead of a coil spring, and by AVA International in its SRM actuator and OOP and OOH models.

Several designs have addressed a need to obtain an incremental force, unleashed toward the end of the actuator stem stroke. One such design is shown in U.S. Pat. No. 4,372,333, where the actuator stem has a tapered surface and there are radially disposed plungers which displace springs when the valve is moved toward an open position. As the valve closes, the plungers traverse the tapered surface and the retained spring force is transferred through the plungers to the actuator stem to boost the force applied to the actuator stem as the valve closes. Similarly, U.S. Pat. No. 4,519,575 uses the same principle but combines in one area the mainsprings used to urge the valve stem up and down and the auxiliary springs which take effect toward the end of the stem stroke. Other devices are known to apply an incremental force to a shaft once the shaft has reached an obstruction. Typical of these devices are U.S. Pat. No. 3,320,861. U.S. Pat. No. 4,523,639 illustrates the use of hydraulic force to move a piston, followed by release of spring force against the collet to lock a ram shaft in the closed position. U.S. Pat. No. 3,272,087 illustrates a device which employs a hydraulic ram with pivoting collets used to stop the pushing force on the ram shaft if the ram encounters a fixed object.

SUMMARY OF THE INVENTION

The invention is a valve actuator or a booster module for an existing valve actuator that provides an incremental force to the valve stem at a position close to valve closure. The force is stored in a spring which is held in the compressed position by a collet. Upon sufficient movement of the valve actuator stem in the direction towards valve closure, the collet which had previously held the spring in a compressed position is freed to move to allow the spring to expand against the collet. Since movement of the collet has caused it to be engaged to the valve actuator stem, the spring forces are transmitted directly to the valve actuator stem via the collet. The spring is oriented in a direction substantially parallel to the valve stem so that substantially all of its retained energy is transmitted directly to the valve stem through the collet.

DETAILED DESCRIPTION OF THE PREFERRED EMBODIMENT

Figure 1A:
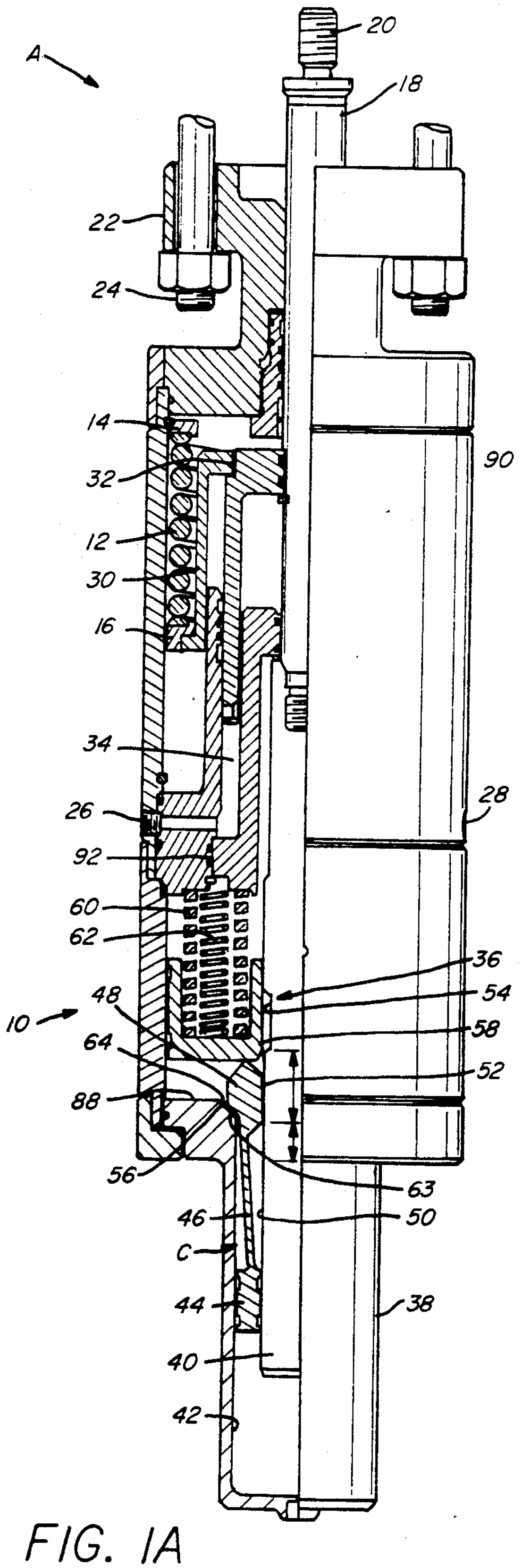
FIG. 1A is a sectional elevational view of the actuator of the present invention showing the valve in the open position.
Figure 1B:
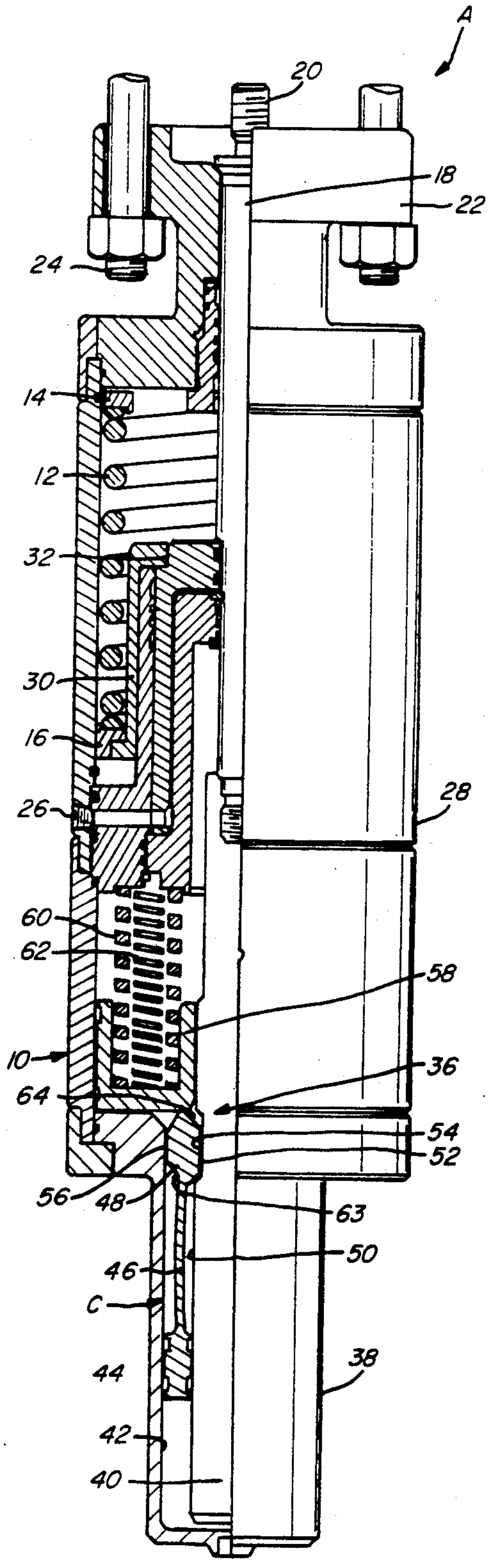
FIG. 1B is a sectional elevational view of the actuator with the valve in the closed position.
Figure 3:
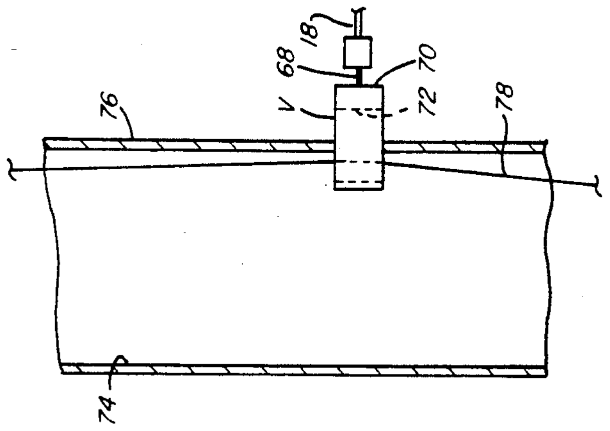
FIG. 3 is a sectional view of a valve gate to which the actuator is connected.

Referring to FIGS. 1A and 1B, the apparatus A is illustrated. The embodiment shown in FIG. 1A shows an entire actuator housing 10. Inside housing 10 is spring 12. Spring 12 is connected to support 14 at one end, and bears against piston 16 at the opposite end. Shaft 18 extends through housing 10 where it terminates at threads 20. Threads 20 are adaptable to be connected to a valve shaft 68 (FIG. 3). Those skilled in the art will appreciate that shaft 18 can be made unitary to extend into the valve body (not shown) or connected to valve shaft 68 in a number of different ways. The apparatus A has a mounting flange 22 and a plurality of bolts 24, which extend through flange 22 for securing flange 22 to the valve body (not shown). It should be noted that support 14 is rigidly connected to the interior of housing 10. Inlet 26 and outlet 28 in housing 10 are connected to a hydraulic or pneumatic system (not shown). As shown in FIG. 1A, application of pneumatic or hydraulic pressure to inlet 26 displaces piston 16 to the position shown in FIG. 1A. Piston 16 is connected to sleeve 30 at a point 32. Accordingly, sleeve 30 moves in tandem with piston 16. As pressure is applied at inlet 26, chamber 34 is pressurized. This pressure build-up in chamber 34 forces piston 16 to compress spring 12. Sleeve 30 guides the movement of piston 16. Shaft 18 has an indented segment 36. Housing 10 has an extension segment 38 to accommodate end 40 of shaft 18. Collet means C is disposed between shaft 18 and interior surface 42 of extension segment 38. Collet means C comprises a collet ring 44 and a plurality of collet fingers 46, each of which terminate at a collet body 48. As seen in FIGS. 1A and 1B, collet body 48 selectively contacts indented segment 36 or surface 50 on shaft 18.

Once shaft 18 is in the position shown in FIG. 1A, the valve V is in the open position. This position is hereafter referred to as the first position. FIG. 1B shows the second position of shaft 18 with the valve (not shown) in a closed position. When the valve is in the closed position (FIG. 1B), collet bodies 48 have a surface 52 in contact with surface 54 in indented segment 36. Collet body 48 has a second surface 56 substantially parallel to surface 52 which is selectively in contact with interior surface 42 of extension segment 38. Collet bodies 48 are wedged within intended segment 36 as shaft 18 moves from the position illustrated in FIG. 1B to a point just short of the position illustrated in FIG. 1A. When hydraulic pressure is applied to inlet 26 and the valve V is to be opened, not only is piston 16 displaced to compress spring 12 but also collet bodies 48, which bear on piston 58, compress springs 60 and 62. Although concentric helical springs 60 and 62 are illustrated, those skilled in the art will appreciate that alternative types of energy storing means can be employed without departing from the spirit of the invention.

As seen in FIGS. 1A and 1B, the application of hydraulic pressure to inlet 26 to open valve V causes movement of shaft 18 from the position shown in FIG. 1B toward the position shown in FIG. 1A. As such movement is initiated, collet bodies 48 bearing on piston 58, and trapped between indented segment 36 and interior surface 42, compress springs 60 and 62. However, collet bodies 48 also contain tapered surface 63. The housing contains tapered surface 64. Collet means C is built with a built-in radially outward bias of collet fingers 46. This built-in outward bias, in combination with the arrival of tapered surface 63 adjacent tapered surface 64, results in outward radial displacement of collet bodies 48 to the position shown in FIG. 1A, where surfaces 63 and 64 are in contact and surface 52 is in contact with surface 50 on shaft 18. It should be noted that nose 66 on collet bodies 48 is always in contact with piston 58. Piston 58 is substantially aligned with shaft 18.

As shaft 18 arrives at its first position (shown in FIG. 1A) due to pressure at inlet 26, spring 12 is fully compressed as are springs 60 and 62, and piston 58 is locked between housing 10 and shaft 18 by virtue of contact with nose 66 of collet bodies 48, which are themselves wedged between shaft 18 and housing 10 by virtue of contact between surfaces 63 with 64 and 52 with 50. After radial outward movement of collet bodies 48, surface 52 is then in contact with surface 50, and shaft 18 is free to complete its movement toward the open position shown in FIG. 1A, while retaining piston 58 in a locked position.

As shown in FIG. 3, shaft 18 is coupled to valve shaft 68, which is in turn connected to slide 70. Slide 70 has a central bore 72 which is adaptable for movement into alignment with bore 74 of pipe 76. When bore 72 is aligned with bore 74, the valve V is open. In this position, a wireline 78 extends through bore 72. As shaft 18 moves from its open position shown in FIG. 1A toward its closed position shown in FIG. 1B, bore 72 moves out of alignment with bore 74, eventually necessitating the cutting off of wireline 78. This need for cutting the wireline 78 arises at a point close to the completion of movement of shaft 18 from its first to its second position.

When an emergency situation arises requiring the closing of the valve V, hydraulic pressure which had been maintained within housing 10 is relieved through ports 26 and/or 28. As a result, spring 12, which is then compressed, initiates movement of shaft 18 from its first to its second position. As shaft 18 moves, piston 58 remains locked, as shown in FIG. 1A. After shaft 18 is moved a distance signified by arrow 80, indented segment 36 comes into alignment with collet bodies 48, thereby allowing collet bodies 48 room to move radially inward into indented segment 36. At that point, the force imparted by piston 58 on nose 66 forces collet bodies 48 to move radially inward by pushing surface 63 along surface 64. The radial inward movement by collet bodies 48 into indented segment 36 unlocks piston 58. What results is the forces stored in compressed springs 60 and 62 bear on piston 58, which in turn bears on collet bodies 48, which in turn are, at that point in the stroke of shaft 18, locked to shaft 18 by virtue of surface 56 abutting surface 42 and surface 54 abutting surface 52. Thus, for the last segment of movement of shaft 18 from position one to position two, as shown by arrow 82, substantially the entire retained force on springs 60 and 62 (at least 8,000 lbs.) is transmitted in the same direction of movement as shaft 18, directly to shaft 18. It can be seen that substantially all of the retained force in compressed springs 60 and 62 shown in FIG. 1A is transmitted directly to shaft 18 during the portion of movement of shaft 18 indicated by arrow 82. This is the portion of the stroke of shaft 18 at which point wireline 78 is cut by slide 70 (see FIG. 3). Thereafter, the previously described steps are repeated for moving shaft 18 back from position two to position one to open valve V.

As presented in FIGS. 1A and 1B, a valve actuator capable of applying a force of a minimum of 7–8,000 lbs. toward the end of the stroke of shaft 18, depicted by arrow 82, is provided. The housing 10 can be of a fairly slim diameter which allows it to withstand the hydraulic pressures expected with a thinner wall and an overall more economical construction. Importantly, substantially all of the forces retained in springs 60 and 62 are transmitted directly to shaft 18 in view of the alignment of springs 60 and 62, substantially parallel to the centerline of shaft 18. Spring 12 functions during normal operations to store a sufficient force when compressed (see FIG. 1A), and to apply a closing force to the valve V in the event of loss of hydraulic pressure at inlet 26 or in the event of emergency where the pressure within housing 10 supplied at port 26 is deliberately turned off to initiate movement of shaft 18 from its first to its second positions. The stored force of spring 12 when fully compressed needs only to be in the order of 1,500–2,000 lbs. or just enough to start shaft 18 moving. This is contrasted with prior art designs where the spring was required to store about 20,000 lbs. of force when fully compressed so that near valve closure, it would still have the minimum 8,000 lbs. required to cut the wireline 78.

It should also be noted, as shown in FIG. 1B, that piston 58 ultimately stops moving when it contacts surface 88. Since sleeve 30 is connected to shaft 18 at point 90, the movement of shaft 18 is stopped when sleeve 30 bottoms against support 92. Support 92 also serves as a base for springs 60 and 62.

Figure 2B:
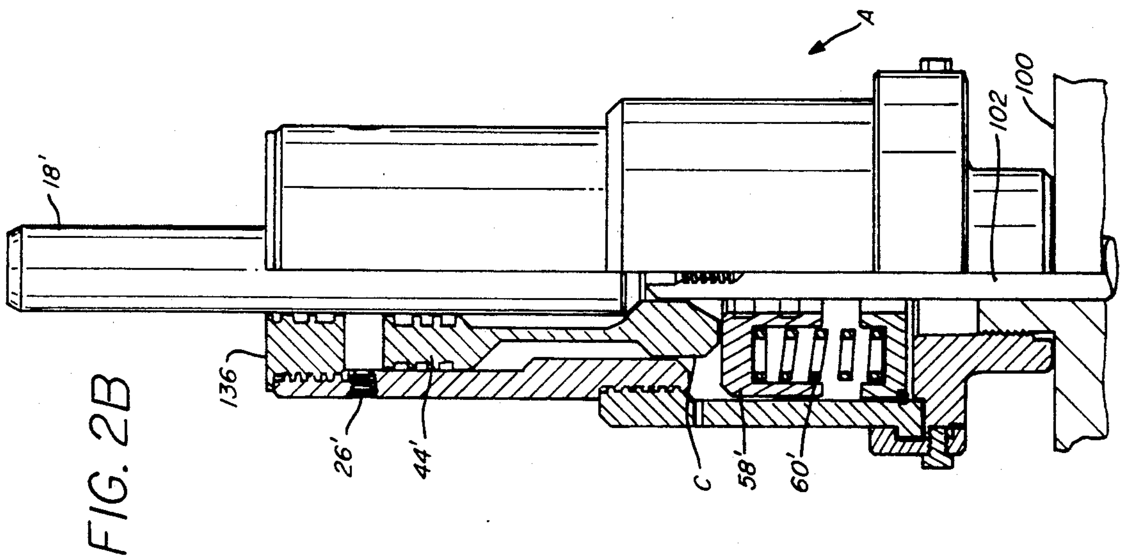
FIG. 2B is a sectional elevational view of the modular assembly adaptable for mounting to an existing valve actuator showing the valve closed.
Figure 2A:
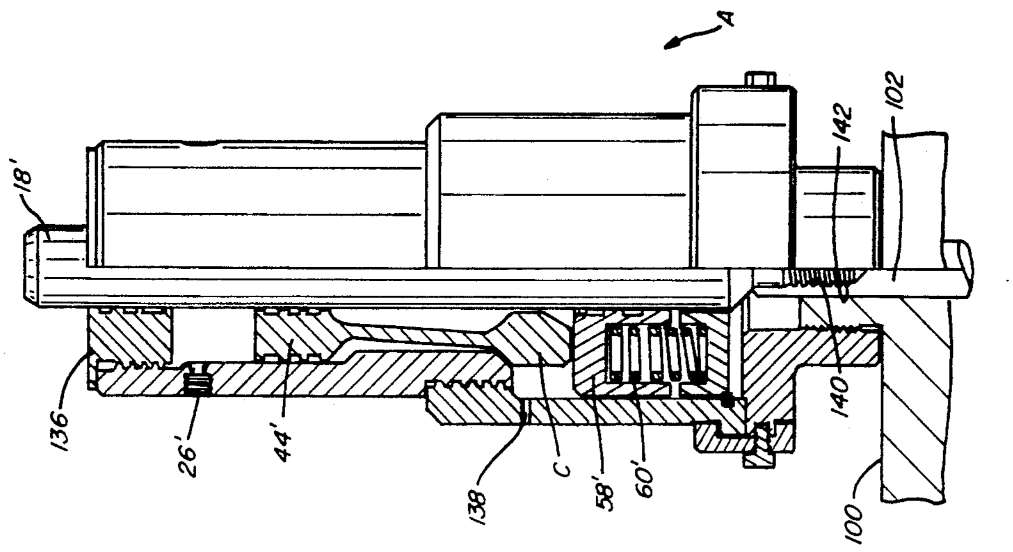
FIG. 2A is a sectional elevational view of the modular assembly adaptable for mounting to an existing valve actuator.

FIG. 2A and 2B shows a modular design which is adaptable for connection to an existing valve actuator 100. An actuator shaft 102 extends from actuator 100. As before, the components of the booster module in FIG. 2A and 2B are similar to those shown in FIGS. 1A and 1B. The difference in the embodiment shown in FIG. 2A and 2B is that the apparatus A merely contains the springs 60' for applying the booster force. The actuator 100 has within it what serves as spring 12.

Piston 58' is displaced compressing spring 60' by applying hydraulic pressure to inlet 26'. In this embodiment, inlet 26' is located in the housing between end cap 136 and collet ring 44'. While pressure is applied to port 26', trapped air is vented out through ports 138 to allow collet means C to move. In FIG. 2A and 2B the two shafts 102 and 18' are connected together directly via threads 140 and 142. Other types of connections between shafts 102 and 18' are within the scope of the invention. Such connections can encompass lost motion and other connections not involving threads. The principle of operation is the same as described above for FIGS. 1A and 1B.

Although hydraulic pressure has been referred to as being used in this application, it is understood to mean that when hydraulic pressure is referred to, pneumatic pressure can be substituted without departing from the spirit of the invention. The embodiment shown in FIG. 2A and 2B presents a compact modular design which can be adapted to existing actuators to ensure that a sufficient closing force is available at the time when the wireline is being cut by plate 70 (see FIG. 3). Alternatively, the design shown in FIGS. 1A and 1B, which is a unitary valve actuator, can be employed. With the design as shown in FIGS. 1A and 1B, springs in the prior art design which stored up to 20,000 lbs. of force and took up significant amounts of space are replaced by spring 12 which can have a retained force when compressed of only about 2,000 lbs. It is springs 60 and 62, which at the appropriate moment toward the end of the movement of shaft 18 from its first to its second position, apply the necessary force of about 8,000 lbs. to cut the wireline. Substantially the entire force of springs 60 and 62 is applied directly and in a direction parallel to the movement of shaft 18.

The foregoing disclosure and description of the invention are illustrative and explanatory thereof, and various changes in the size, shape and materials, as well as in the details of the illustrated construction, may be made without departing from the spirit of the invention.

I claim:

1. A valve actuator for opening and closing a valve, comprising:

a housing;

a shaft movably mounted to said housing for translation between a first and second position, the valve being open in said first position of said shaft and closed when said shaft is in said second position;

means for selectively urging said shaft between said first and second positions;

force amplifying means adapted for selective engagement with said shaft before it reaches its second position, said force amplifying means storing a force and so disposed as to selectively apply substantially all of said stored force in a direction parallel to said shaft upon engagement with said shaft;

said force amplifying means further comprises a piston mounted in said housing, said piston adapted to selectively move in tandem with said shaft;

collet means in said housing mounted adjacent said shaft and adapted to selectively move in tandem with said shaft for storing and releasing of said force by a force amplifying means, said collet means extending longitudinally along said shaft and further comprising at least one collet head mounted outside of said piston.

2. The apparatus of claim 1, wherein said force amplifying means further comprises:

biasing means mounted inside said housing, said biasing means selectively biasing said piston, said biasing means acting substantially parallel to the axis of said shaft.

3. The apparatus of claim 1, wherein said collet means is selectively retained in a stationery position until said urging means has moved said shaft substantially from its first position toward its second position.

4. The apparatus of claim 1, further comprising:

said shaft adapted to move while said collet means is stationary for a portion of its range of motion in both directions.

5. The apparatus of claim 4, wherein:

said shaft is formed having a means for selectively retaining said collet means, said retaining means on said shaft selectively cooperating with said housing to retain said collet means for tandem movement with said shaft in both directions for a portion of the range of movement of said shaft about its second position.

6. The apparatus of claim 5, wherein:

said housing is formed having a first tapered surface and said collet means is formed having a second tapered surface cooperating with said first tapered surface;

said collet means being in continual contact with said piston;

whereupon during a portion of the time as said shaft is moved from its second to its first position said housing retains said collet means to said retention means for tandem movement of said shaft and collet means to compress said force amplifying means, and when said shaft movement reverses as a result of the action of said urging means, said piston is released as a result of camming said second tapered surface of said collet means against said first tapered surface of said housing, resulting in movement of said collet means against said first tapered surface of said housing, resulting in movement of said collet means toward said retaining means on said shaft, with the force retained in said force amplifying means applied to said shaft through said collet means.

7. The apparatus of claim 6, wherein said collet means locks said piston during shaft movement from said second to said first positions by a release of said collet means for outward radial movement out from said retaining means and along said first tapered surface whereupon said collet means is retained by said piston, said first tapered surface and a portion of said shaft beyond said retaining means as said shaft completes movement to said first position.

8. The apparatus of claim 7, wherein said collet means releases said piston, with said force amplifying means compressed as said shaft nears completion of its movement from said first to said second position, said piston release occuring when said retention means on said shaft is placed adjacent said collet means, said piston forcing said surface on said collet means along said first tapered surface on said housing to displace said collet means into said retention means, said force amplifying means driving said shaft by pushing on said piston which bears on said collet means which is held to said shaft by said housing and said retention means as said shaft completes its movement to said second position.

9. The apparatus of claim 8, wherein said collet means further comprises:

a ring circumscribing said shaft;

a plurality of collet bodies connected to said ring by a plurality of collet fingers;

said fingers connected to said ring in a manner to instill a radial outward bias away from said shaft to said collet bodies;

said force amplifying means is a spring;

said retention means is a notch on said shaft.

10. A valve actuator for opening and closing a valve, comprising:

a housing;

a shaft movably mounted to said housing for translation between a first and second position, the valve being open in said first position of said shaft and closed when said shaft is in said second position;

means for selectively urging said shaft between said first and second positions;

force amplifying means adapted for selective engagement with said shaft before it reaches its second position, said force amplifying means storing a force and so disposed as to selectively apply substantially all of said stored force in a direction parallel to said shaft upon engagement with said shaft;

collet means in said housing mounted adjacent said shaft and adapted to move selectively in tandem with said shaft for storing and releasing of a force by said force amplifying means;

said shaft is formed having a means for selectively retaining said collet means, said retaining means on said shaft selectively cooperating with said housing to retain said collet means for tandem movement with said shaft in both directions for a portion of the range of movement of said shaft about its second position;

said housing is formed having a first tapered surface and said collet means is formed having a second tapered surface cooperating with said first tapered surface;

said collet means being in continual contact with said force amplifying means;

whereupon during a portion of the time as said shaft is moved from its second to its first position said housing retains said collet means to said retention means for tandem movement of said shaft and collet means to compress said force amplifying means, and when said shaft movement reverses as a result of the action of said urging means, said force amplifying means is released as a result of camming said second tapered surface of said collet means against said first tapered surface of said housing, resulting in movement of said collet means toward said retaining means on said shaft, with the force retained in said force amplifying means applied to said shaft through said collet means.

* * * * *